Sept. 7, 1926.

S. J. HARDING

CAKE CUTTER

Filed Dec. 29, 1925

1,598,717

Witnesses
C. L. McDonald
Howard D. Orr

Inventor
Simon J. Harding
By
Attorney

Patented Sept. 7, 1926.

1,598,717

UNITED STATES PATENT OFFICE.

SIMON JOSEPH HARDING, OF WEST BALDWIN, MAINE.

CAKE CUTTER.

Application filed December 29, 1925. Serial No. 78,129.

This invention relates to cake or cookie cutters and is designed as an improvement on the structure disclosed in Patent Number 848,823, issued to me on April 2, 1907. The object is to provide a simple device of strong and durable construction which may be easily adjusted and operated to cut cakes or cookies from sheets of dough with plain circular edges or with fluted edges and formed either with or without a central opening.

Another object is to provide improved means for holding the smaller, supplemental or inner cutter which forms the hole in the cake when desired, said means rigidly holding the said cutter, either to coact with the plain circular cutting edge of the main cutter constituted by the body of the device, or to coact with the fluted cutting edge thereof, thus eliminating the necessity of squeezing the body member to deflect the same and permit the reversal of the inner cutter as in the aforesaid patent.

A final object is to provide a convenient cake cutting device which may be cheaply manufactured and sold at a low cost to cut cakes or cookies of various designs or forms, the outer cutter being reinforced to maintain a true circular form, the reversal of the inner cutter being easily accomplished by a simple pull of the operating handle, and the entire device being readily cleansed and kept in a sanitary condition.

A full and complete understanding of the invention may be obtained from a consideration of the following detailed description, taken in connection with the accompanying drawing forming a part of this specification, it being understood that while the drawing shows a practical form of the invention, the latter is not to be confined to strict conformity with the showing thereof, but may be changed or modified, so long as such changes or modifications mark no material departure from the salient features of the invention, as specifically pointed out in the appended claims.

In the drawing, in which similar reference characters designate corresponding parts throughout the several figures:—

Figure 1:
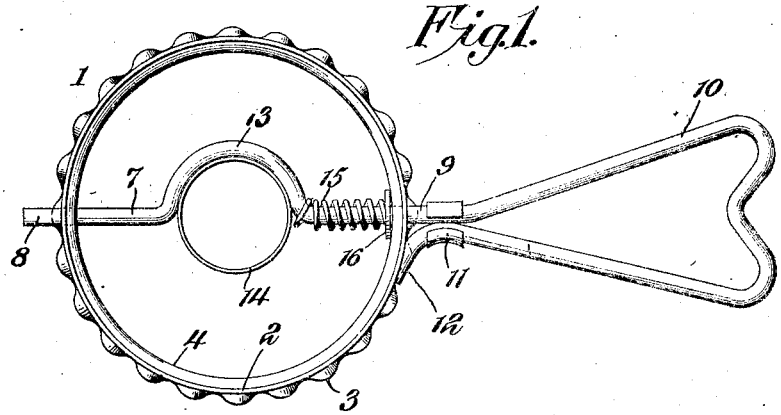
Figure 1 is a top plan view of the device showing the plain cutting edge.
Figure 2:
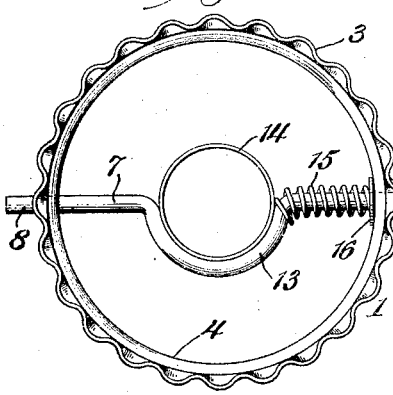
Figure 2 is a similar view but showing the fluted cutting edge, a portion of the operating handle being omitted.
Figure 3:
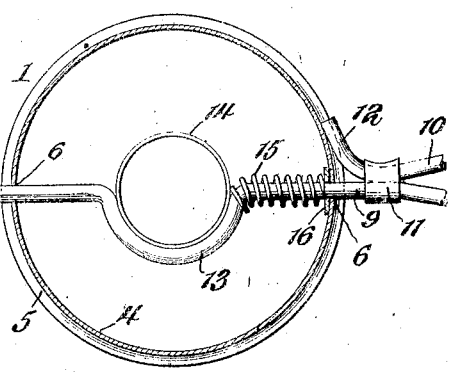
Figure 3 is a horizontal section through the device.

Referring to the drawing there is shown a body member 1 formed of suitable sheet metal and constituting the main cutter of the device, said body member being of cylindrical form having a diameter of the usual cookie or biscuit and open at each end, the abutting ends of the sheet of metal comprising the body member being brought together and joined by overlapping and soldering, or a flush, soldered joint may be employed, no attempt being made to illustrate same in the drawing.

The body member has one end edge plain or continuous, as shown at 2, for the purpose of cutting plain edge cakes, cookies or biscuits, while the other, open end is continuously fluted, as shown at 3, to be used if desired, for the same purpose, and in order to strengthen the said body member and prevent buckling or distorting the circular form thereof, a circumferential rib 4 is formed therein midway between the ends, the sheet metal being simply pressed inwardly to provide an exterior groove 5 on the outside of the same.

At diametrically opposite points the body member is further provided with a pair of apertures 6 located exactly in said groove, or through the rib or bead, and slidably mounted in said apertures, which act as bearings, is a supporting rod 7 formed of relatively stout metal, one end of said rod extending slightly beyond its respective bearing 6, as shown as 8, while the other end portion 9 of the rod extends through its respective bearing for a distance and is then bent outwardly at an angle and in a horizontal plane, to form one side member of a horizontally disposed operating handle 10, the remaining portion of the rod being returned towards the body member at a corresponding angle, and the same is attached to the bearing portion of the rod by a suitable clip 11 surrounding the two portions of the rod and being tightly pressed into engagement therewith. The clip 11 is spaced from the side of the body member, and the terminal of the rod is bent at an acute angle to the said bearing portion to form a locking arm 12 normally engaging in the aforesaid groove 5 on the exterior of the body, in spaced relation to and at one side or the other of the axis of rotation of the bearing portion of the supporting rod 7.

The supporting rod 7 is provided midway between the sides of the body member with a semi-circular bend 13 normally in exact concentric relation to the body member, and secured, as by soldering, brazing or otherwise, in the bend 13, is a supplemental or inner cutter 14, formed of sheet metal similar to the body and bent into cylindrical form, of a diameter much smaller than the body and normally located concentric thereto, the ends of said inner cutter being open and plain or continuous.

Figure 4:
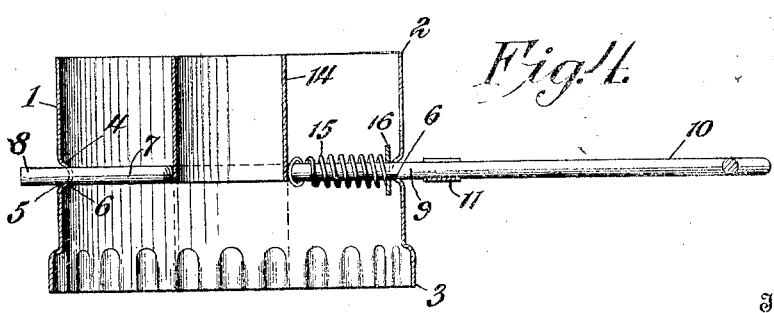
Figure 4 is a vertical section taken longitudinally of the handle.

As shown in Figure 4 of the drawing, one end of the inner cutter is attached to the bend in the supporting rod 7, and the other open end thereof is exactly flush with either the plain end or the fluted end of the body depending on which direction the latter is swung, it being understood that the inner cutter may be turned about the axis of the supporting rod by merely pulling on the handle to withdraw the locking arm 12 from its seat in the groove 5, and at the same time turning the handle one-half revolution to allow the locking arm to engage in the groove at the other side of the bearing portion of the supporting arm.

A coiled spring 15 is mounted on the supporting rod 7 at the side adjacent to the handle, said spring bearing at its inner end against the bend 13, and at its outer end against a washer 16 interposed between the spring and the adjacent inner face of the wall of the body member to exert a constant pressure inwardly and hold the locking arm rigidly in its seat in the groove, at which time the two cutters are in concentric relation to each other.

From the foregoing it will be seen that a simple and cheaply manufactured cake or cookie cutting device has been provided having a reversible main cutter whereby the cakes or cookies may have plain or fluted edges, and either may have a central hole or not as desired, the means for reversing the inner cutter and rigidly holding the same in either position, and the provision of the reinforcing band or bead around the body member or main cutter to maintain the same in true cylindrical form being an advantageous improvement over the structure of the aforesaid patent, in which it was necessary to compress the sides of the main cutter in order to permit of turning the inner cutter, and which often results in the distortion of the main cutter.

What is claimed is:—

1. A cake cutter comprising a body member constituting a main cutter provided with opposite apertures located midway between the ends thereof and having an exterior seat, a supporting rod mounted in said apertures, an inner cutter carried by the rod, said rod being extended at one end exteriorly of the body to form a handle, a lock arm carried by the handle and adapted to engage in said seat, and a spring for normally holding the arm therein.

2. A cake cutter comprising a circular body member constituting a main cutter, said body member having an intermediate circumferential groove provided with diametrically opposite apertures, a supporting rod traversing the apertures and adapted to slide therein, a smaller circular cutter carried by the rod in concentric relation to the body member, said rod being extended at one end and returned toward the body member to form a handle, the returned portion being secured to the rod proper and the terminal being bent outwardly to form a lock arm adapted to engage in the groove at either side of the rod, and a spring mounted on the rod to hold said arm in engagement.

3. A cake cutter comprising a metallic cylindrical body member open at each end to provide a double cutter, one edge being plain and the other fluted, said body having a circumferential, inwardly extending bead pressed in its sides midway between the ends thereof to form a strengthening rib and to form a substantially semi-circular seat around the outside thereof, said seat having diametrically opposite apertures therein, a supporting rod sidably mounted in said apertures in transverse relation to the body, said rod having a semi-circular bend concentric with the body member, a circular inner cutter of smaller diameter than the body and secured at one open end in said bend, the opposite open end being flush with one of the cutting edges of the body, one end of said supporting rod being extended exterior of the body and formed into an outstanding loop to constitute a handle and returned toward the body and secured to the rod, the terminal of the rod being bent outwardly and forwardly to form an arm to fit in said semi-circular seat, and a coiled spring surrounding the rod between the inner and outer cutters to hold the arm in the seat and prevent rotation of the rod and inner cutter and maintain the latter in concentric relation to the outer cutter.

In testimony, that I claim the foregoing as my own I have hereto affixed my signature.

SIMON JOSEPH HARDING.